(12) United States Patent  
Ungureanu et al.

(10) Patent No.: US 9,129,394 B2
(45) Date of Patent: Sep. 8, 2015

(54) CPU-GPU PARALLELIZATION

(71) Applicant: Microsoft, Redmond, WA (US)

(72) Inventors: Oreste Dorin Ungureanu, Duvall, WA (US); Harneet Sidhana, Seattle, WA (US); Mohamed Sadek, Sammamish, WA (US); Sandeep Prabhakar, Redmond, WA (US); Steve Pronovost, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 13/715,725

(22) Filed: Dec. 14, 2012

(65) Prior Publication Data

US 2014/0168229 A1  Jun. 19, 2014

(51) Int. Cl.
*G06T 1/20* (2006.01)
*G06F 9/48* (2006.01)
*G06F 9/52* (2006.01)

(52) U.S. Cl.
CPC .............. *G06T 1/20* (2013.01); *G06F 9/4843* (2013.01); *G06F 9/52* (2013.01)

(58) Field of Classification Search
CPC ......... G09G 5/12; G09G 5/395; G06F 9/4843
USPC .................................................. 345/503–505
See application file for complete search history.

(56) References Cited

U.S. PATENT DOCUMENTS 8,310,494 B2 * 11/2012 Hendry et al. ................ 345/534
8,484,647 B2 *  7/2013 Hendry et al. ................ 718/102

* cited by examiner

*Primary Examiner* — Hau Nguyen
(74) *Attorney, Agent, or Firm* — John Jardine; Kate Drakos; Micky Minhas

(57) ABSTRACT

Embodiments described herein relate to improving throughput of a CPU and a GPU working in conjunction to render graphics. Time frames for executing CPU and GPU work units are synchronized with a refresh rate of a display. Pending CPU work is performed when a time frame starts (a vsync occurs). When a prior GPU work unit is still executing on the GPU, then a parallel mode is entered. In the parallel mode, some GPU work and some CPU work is performed concurrently. When the parallel mode is exited, for example when there is no CPU work to perform, the parallel mode may be exited.

20 Claims, 8 Drawing Sheets

CPU-GPU PARALLELIZATION

BACKGROUND

Various types of software use a central processing unit (CPU) in combination with a graphics processing unit (GPU) to display graphics on a display. Examples of such software are window managers, three-dimensional games, animation software, application software, and others. Typically, events such as user inputs or interactions with a user interface, animations, video playbacks, system events that require the display of information, or other events require both application-level logical processing to determine, for example, what objects may need to be displayed or moved, what object portions have been hidden or exposed, textures to be rendered, user interface elements to draw, and other logical operations that, perhaps by way of an application programming interface, generate code or instructions to be executed on a GPU.

Various approaches have been used to improve the flow of work between the CPU and the GPU and overall computational efficiency. For example, double buffering has been used to improve speed and triple buffering has been used to allow for some CPU-GPU concurrency. A technique referred to as vsync (vertical synchronization), which synchronizes graphics generation and painting with display refreshes, has been used to avoid artifacts such as tearing. There remains a need to improve overall throughput when the vsync approach is used. Some previous approaches have improved overall throughput but at the expense of artifacts such as skipped frames or at the cost of increased hardware requirements, which can be problematic for resource-constrained devices. It would be beneficial if overall throughput could be improved with the vsync technique without introducing unacceptable lag (delay from event to corresponding display of graphics), stuttering, or other undesirable side effects.

Techniques related to CPU-GPU parallelization are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein relate to improving throughput of a CPU and a GPU working in conjunction to render graphics. Time frames for executing CPU and GPU work units are synchronized with a refresh rate of a display. Pending CPU work is performed when a time frame starts (a vsync occurs). When a prior GPU work unit is still executing on the GPU, then a parallel mode is entered. In the parallel mode, some GPU work and some CPU work is performed concurrently. When the parallel mode is exited, for example when there is no CPU work to perform, the parallel mode may be exited.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to techniques for parallelizing execution of a CPU and a GPU. The following description will begin with some examples hardware and software contexts for implementing the techniques. An explanation of some prior aspects of vsync-based rendering will be described next, including non-parallel alternating CPU-GPU execution. Techniques for allowing parallel CPU-GPU execution are then discussed. Finally, the description will cover details of switching between a parallel mode and a non-parallel mode and some advantages thereof.

Figure 1:
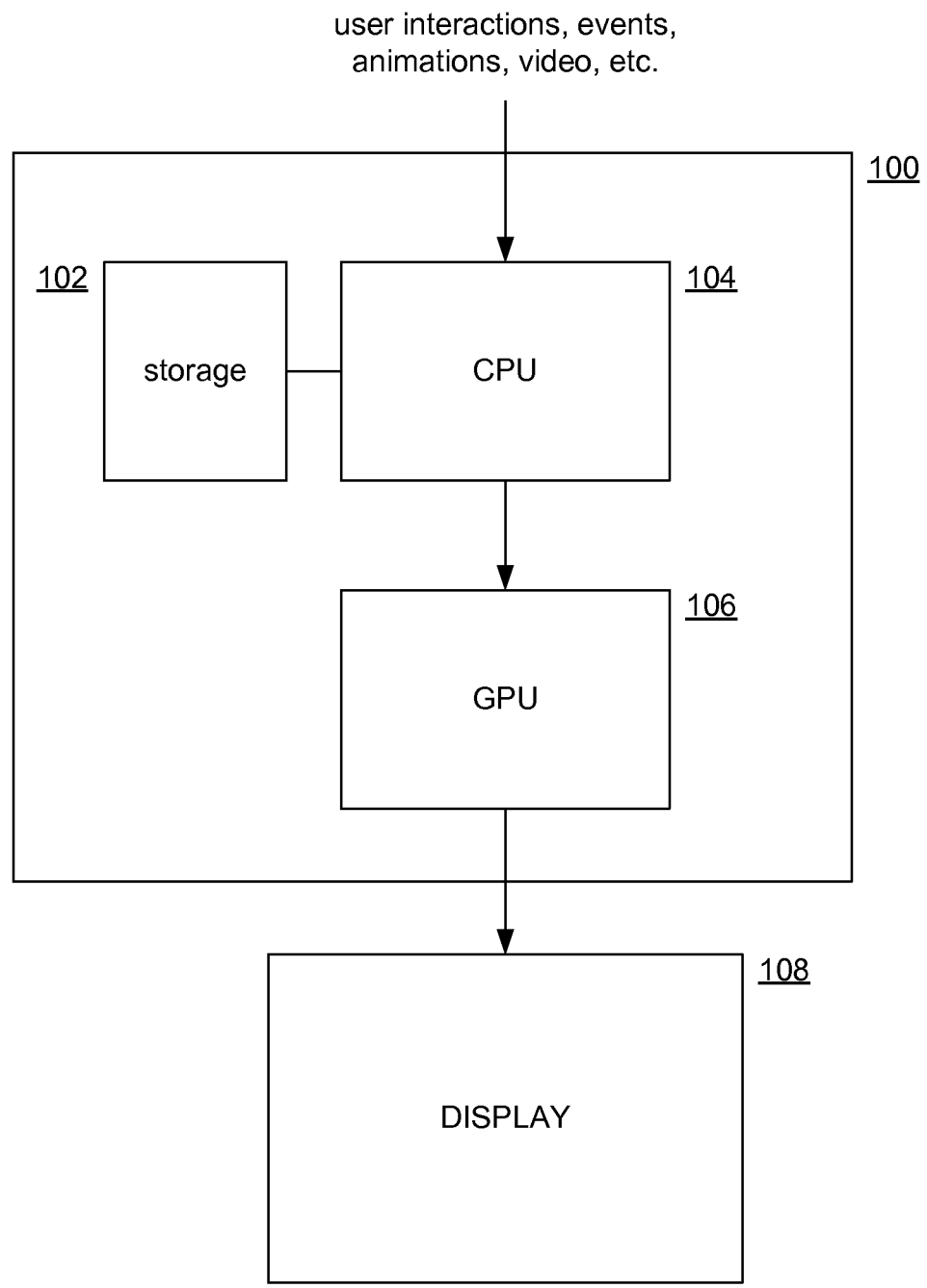
FIG. 1 shows an example computing device.

FIG. 1 shows an example computing device 100. The computing device has storage 102, a CPU 104, a GPU 106, and a display 108. The storage, described in more detail at the end, stores instructions to execute rendering software of the type mentioned in the Background, e.g., software that implements virtual three-dimensional graphics, compositing window managers, or any other graphics generating software. Various graphics-driving events occur such as user manipulations of a graphical user interface, the beginning of a virtual reality simulation, rendering of video data by a decoder, user interface animations, etc. As the graphics-driving events occur, high level logic is executed on the CPU 104 (e.g., a window manager updating its data structures), which in turn generates code to be executed by the GPU 106 to generate corresponding frame images to be displayed on the display 108.

Figure 2:
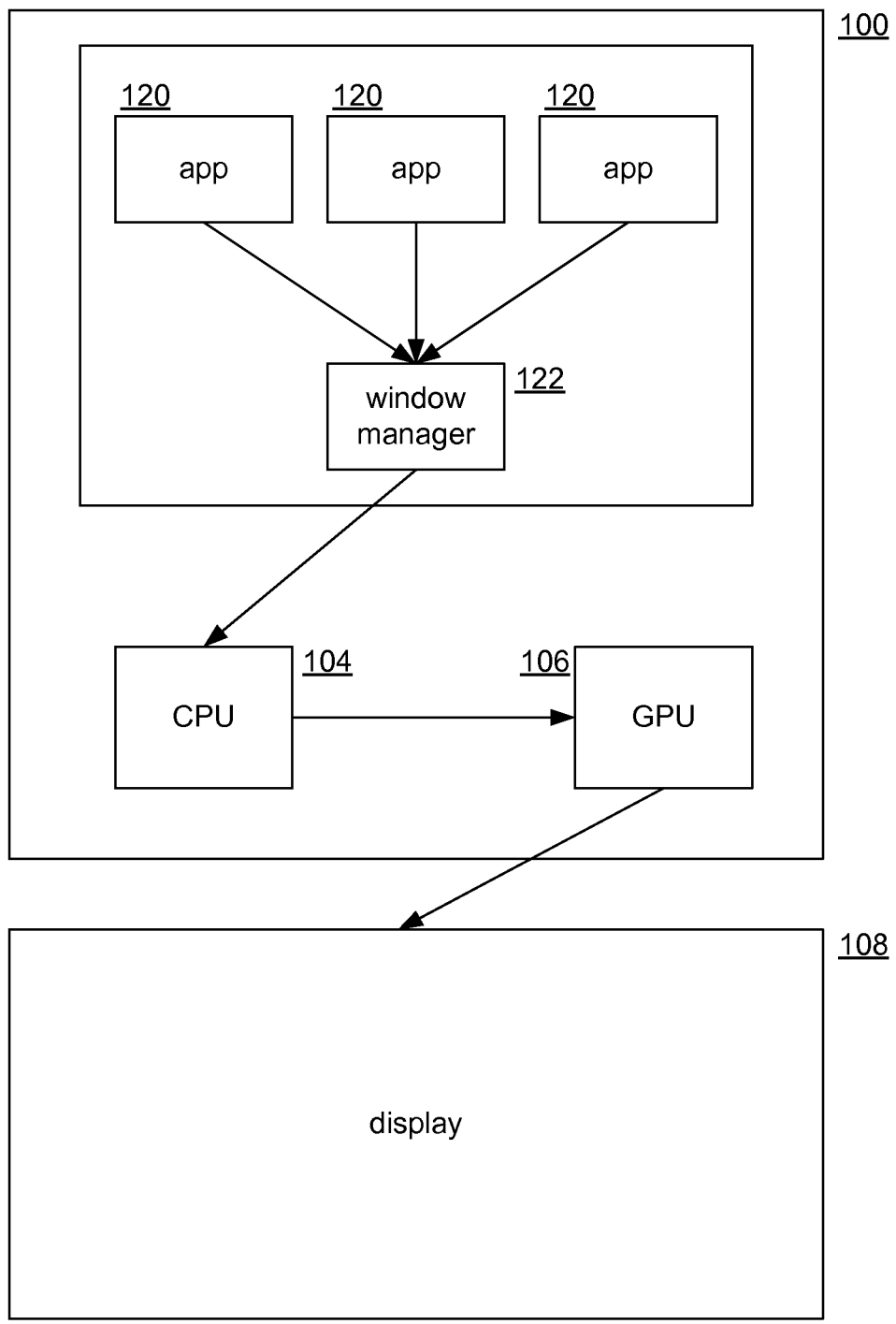
FIG. 2 shows example software that may execute on CPU.

FIG. 2 shows example software that may execute on CPU 104. Various applications 120 may be operated by a user. Corresponding windowing and input events may be handled by a window manager 122, which may, for example, perform window compositing and other known functions.

Figure 3:
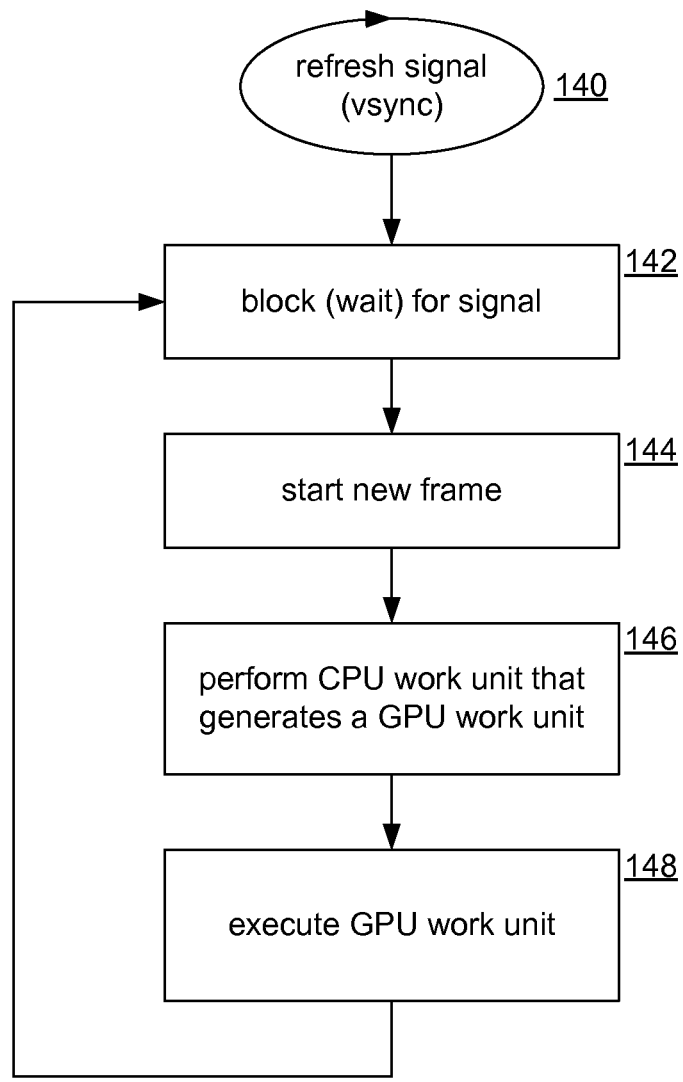
FIG. 3 shows a process where execution of CPU and GPU work are synchronized with refreshes of a display.

FIG. 3 shows a process where execution of CPU and GPU work is synchronized with refreshes of the display 108. Although the vsync approach to rendering has been used before and implementation details can be found elsewhere, a brief description follows. At step 140 a refresh signal is periodically received at a frequency corresponding to the refresh rate of the display 108. The refresh rate may be constant or may be varied according to a dynamic adaptation algorithm. The application software or the like (e.g., a window manager), at step 142, block-waits for the refresh signal. When a refresh signal is received, a new processing frame is started at step 144. This may involve determining if there is any queued CPU work to be performed. An amount or unit of CPU work may be dequeued and start executing, at step 146, on the CPU. This may involve any high level operations that determine, for example, what objects to move, where to move them, what objects have changed, what windowing data structures need to be updated, and so forth. As the CPU work unit executes, it generates a GPU work unit by issuing instructions or calls to a library, API, graphics subsystem, or the like, which translates high level graphics calls or instructions to graphics code that can be executed by the GPU; a GPU work unit. At step 148, when the CPU work unit is finished or suspended, in the same processing frame the GPU work unit begins executing on the GPU. If stutters are to be avoided and if the GPU-rendered graphics (a frame image) are to be displayed with minimal lag after the initiating event, the CPU work unit finishes in the same processing frame and the resulting frame image is displayed for the current refresh cycle.

Figure 4:
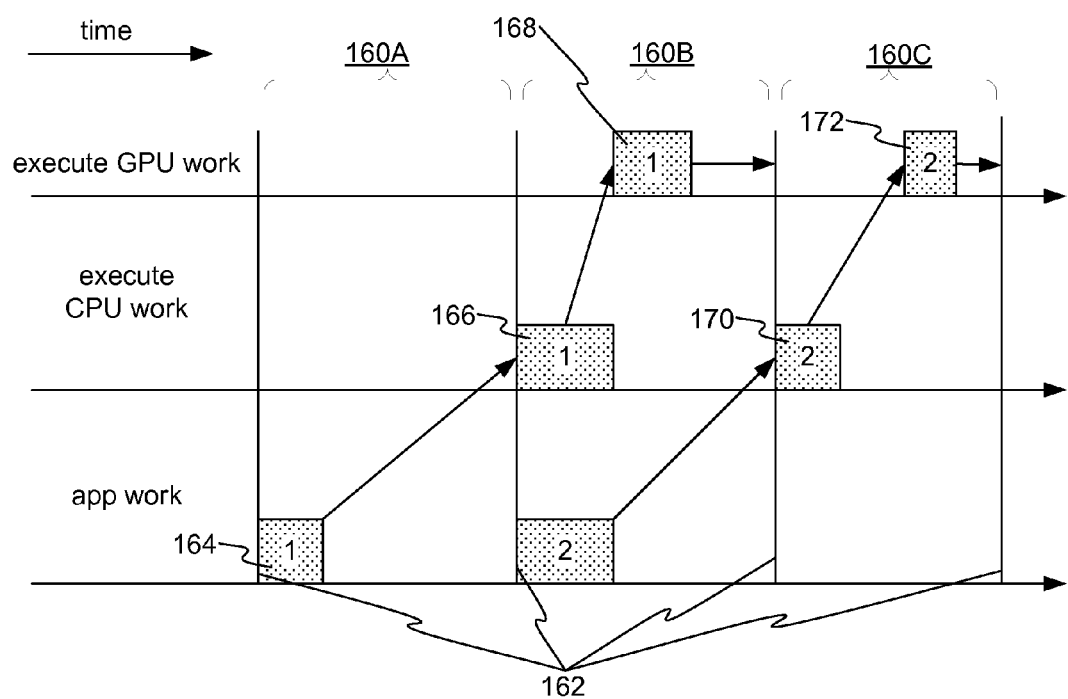
FIG. 4 shows a diagram of a non-parallel vsync mode where CPU work units and GPU work units are synchronized with display refreshes.

FIG. 4 shows a diagram of a non-parallel vsync mode where CPU work units and GPU work units are synchronized with display refreshes. Time is shown as progressing from left to right through a sequence of processing frames 160A, 160B, and 106C. The frames 160A, 160B, 160C begin and end when vsync signals 162 occur. Initially, starting in the lower left box an application executing by the CPU performs some work 164. The work 164 generates a CPU work unit 166. The CPU work unit 166 begins executing when the vsync signal 162 for frame 160B occurs. As the CPU work unit 166 executes on the CPU it generates a GPU work unit 168 to be executed by the GPU. Note that in this non-parallel mode the GPU work unit 168 begins executing after the CPU work unit 166 has completed. As used herein, non-parallel execution refers to the non-parallel execution of (i) the CPU work that generates the GPU work (e.g., via a graphics API or the like) and (ii) the corresponding GPU work. In this non-parallel mode other unrelated CPU work may be running in parallel with the GPU work.

When frame 160B completes, new frame 160C starts, executing the next CPU work unit 170, which generates the next GPU work unit 174. Again, GPU executes the GPU work unit 172 in the same frame 160C. This process of repeatedly executing chunks of work in synchronization with refreshes of the display continues as long as there is work to be done. For example, the process many continue until a user interface animation completes.

Figure 5:
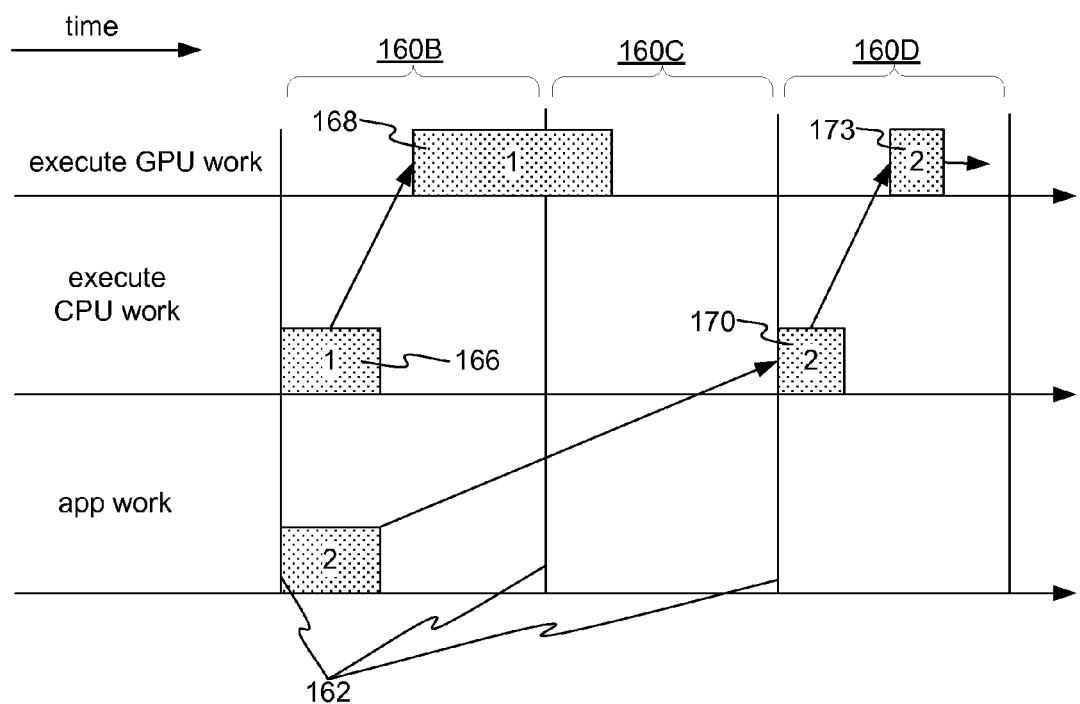
FIG. 5 shows an example of when stutter, lag, or other artifacts can occur in a non-parallel vsync mode.

FIG. 5 shows an example of when stutter, lag, or other artifacts can occur in a non-parallel vsync mode. In this example, the GPU work unit 168 overruns its frame 160B. At this point, either the GPU work unit 168 is ended before completing when frame 160C starts, or the next CPU work unit 170 is delayed; frame 160C is skipped and the CPU work unit 170 starts executing at the start of frame 160D. If it supposed that the CPU work units were initiated by a user manipulation of a window, for example, then there may be a delay between the user's manipulation and a corresponding graphical display. If an animation is being played, the animation may play smoothly.

Figure 6:
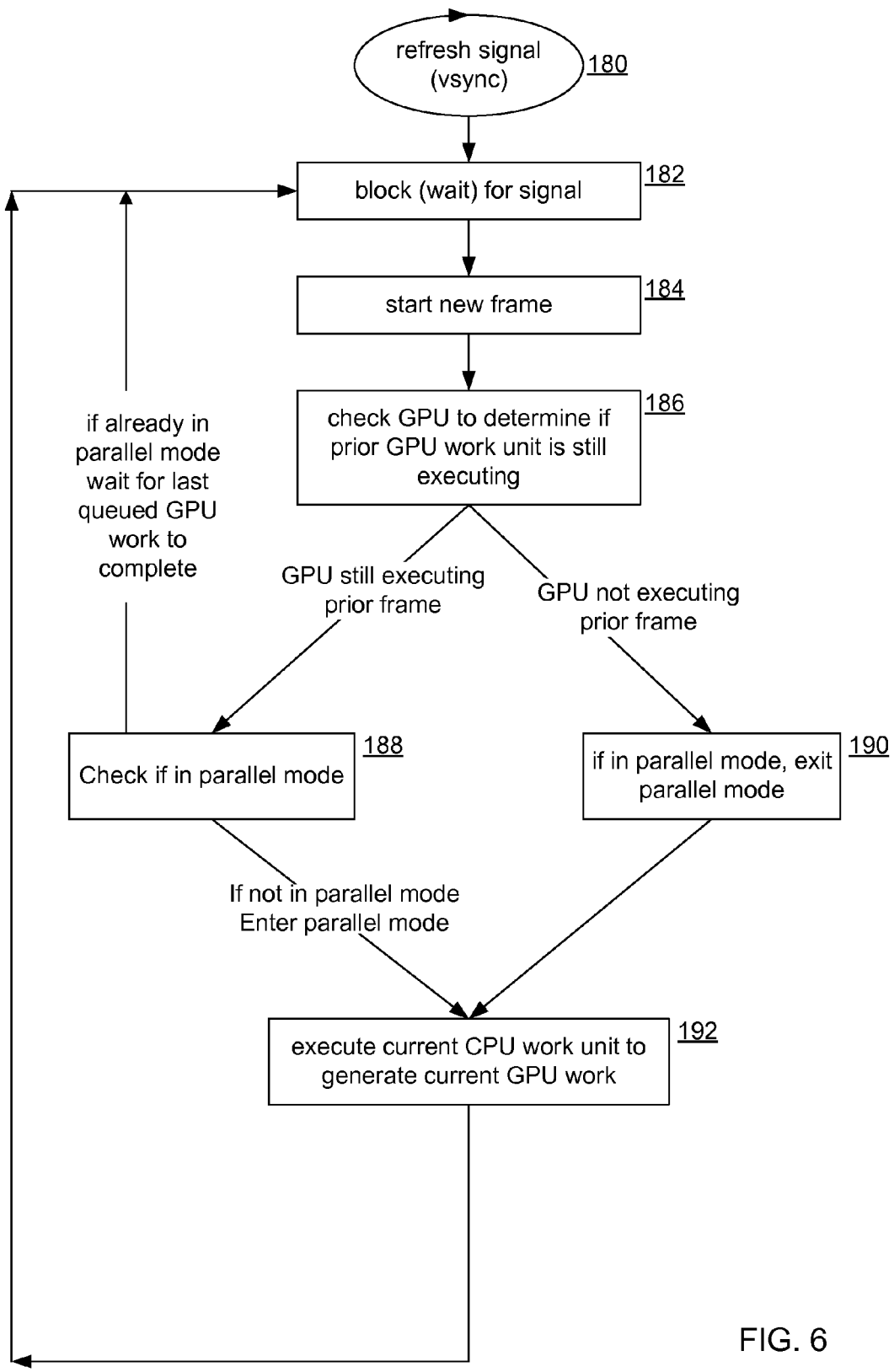
FIG. 6 shows a process for dynamically alternating between a non-parallel mode and a parallel mode.

FIG. 6 shows a process for dynamically alternating between a non-parallel mode and a parallel mode. At step 180 a refresh or vsync signal occurs or is received. The application code blocked at step 182 receives a refresh signal, event, etc., indicating the start of a new processing frame. Before, during, or after executing the currently pending CPU work unit, the GPU is checked to determine if the GPU is still executing a prior GPU work unit. If the prior frame's GPU unit is still executing, then at step 188 the process checks whether it is already in parallel mode. If not, then the process enters parallel mode and proceeds to step 192. If the process is in parallel mode, then the process continues to step 182. If the GPU is idle or not executing a prior frame's GPU work, then at step 190 the process either re-enters or stays in the non-parallel mode. In an embodiment where step 186 is performed at the beginning of the new frame, step 192 of executing the current CPU work unit is executed on the CPU, which generates a new GPU work unit. At step 194 the timing of execution of the GPU work is determined according to whether the process is in parallel mode. If the process is in parallel mode, then at step 194 the newly generated GPU work unit is scheduled to execute on the GPU at the start of the next frame. Or, in another embodiment shown in FIG. 8, the GPU work unit can begin executing when the current GPU work unit finishes, although such execution may still end at a next frame. As will be explained below, if the generated GPU work completes in a later frame then lag may be added (as will be the case when GPU work units start at the beginning of a later or next frame).

To summarize, while in parallel mode, GPU work units may execute in parallel with CPU work units while maintaining synchronization with the refresh signal. Parallel mode may be entered when pending or executing GPU work is detected. Parallel mode may be exited when no CPU work is pending (when the software that is handling the events is idle).

Figure 7:
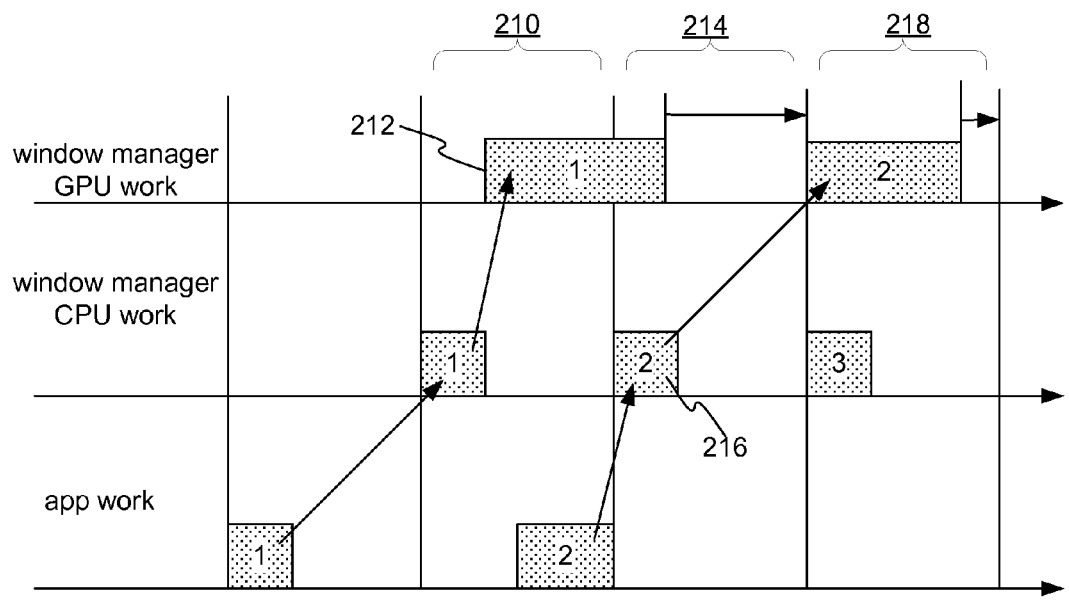
FIG. 7 shows parallel execution of CPU work units and GPU work units.

FIG. 7 shows parallel execution of CPU work units and GPU work units. At frame 210, while in non-parallel mode, GPU work unit 212 starts executing but overruns the frame. Because the GPU at the end of frame 210 has not finished generating a new frame image, the display refresh when frame 210 ends only redisplays the previous frame image; a new frame is not displayed for frame 210 and the GPU work unit 212's execution carries over into the next frame; frame 214. When frame 214 begins (or possibly later in frame 214) it is determined that GPU work unit 212 is still executing, which triggers entry into the parallel mode. The next CPU work unit, CPU work unit 216, begins executing on the CPU at the start of frame 214 in parallel with the execution of GPU work unit 212 on the GPU. When the GPU work unit 212 completes in frame 214, a new frame image will have been generated, which is displayed at the next refresh (when frame 214 ends). If there is a CPU work unit pending when frame 214 starts (or when frame 218 starts), then the process remains in parallel mode. As long as the total time of execution of a CPU work unit and its corresponding GPU work unit is greater than the time of a frame (vsync), then the process should remain in parallel mode. If the total execution time of a CPU work unit and its corresponding GPU work unit exceeds the time of two frames, then artifacts will start to occur.

Figure 8:
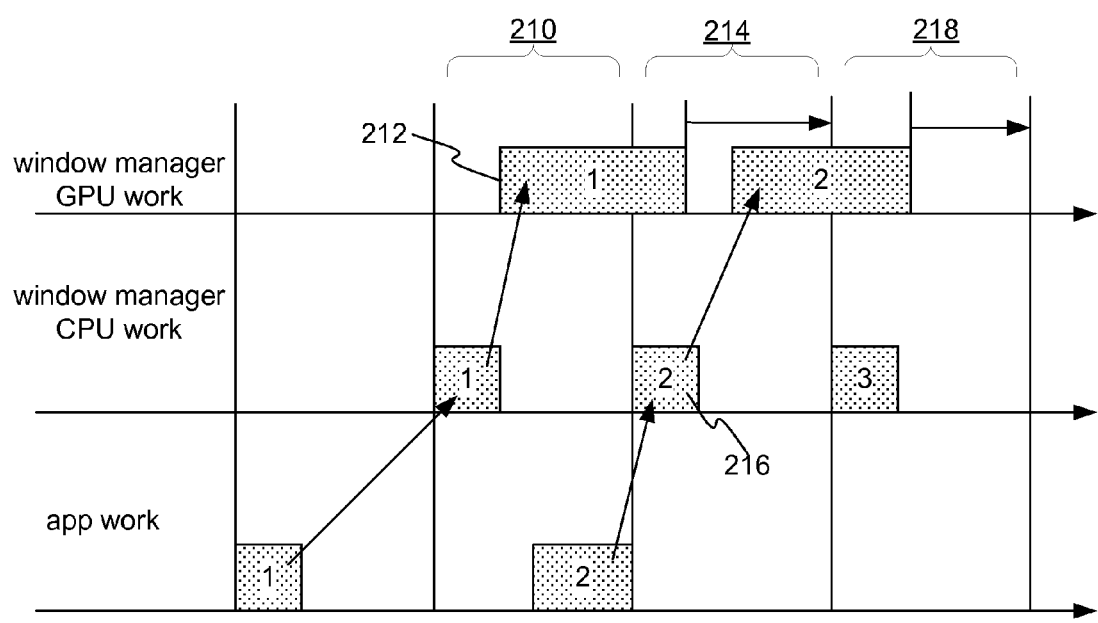
FIG. 8 shows behavior of another embodiment where GPU work units begin executing mid-frame.

While the checking for execution of prior GPU work can be performed at the start of a new frame, such checking can be performed at other stages of the new frame, for example, when CPU work in the current frame finishes, during execution of the current CPU work (e.g., by a timer), or as otherwise convenient for the implementation. In one embodiment, in parallel mode, the GPU work units start at the beginning of frames following the frames of their respective CPU work units (see FIG. 7). FIG. 8 shows behavior of another embodiment where GPU work units begin executing mid-frame, for example, as soon as GPU work units are ready for processing. This approach, which may require additional synchronization logic and can in some cases reduce latency, increase overall concurrency, or hasten the exit from parallel mode.

CONCLUSION

Embodiments and features discussed above can be realized in the form of information stored in volatile or non-volatile computer or device readable media. This is deemed to exclude signals per se, and rather includes physical storage media or devices such as optical storage (e.g., compact-disk read-only memory (CD-ROM)), magnetic media, flash read-only memory (ROM), random access memory (RAM), or other non-signal physical means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of scheduling central processing unit (CPU) work units and respective graphics processing unit (GPU) work units, the method performed by a device comprising a CPU, a GPU, and a display, the method comprising:
    synchronizing starts of execution of the CPU work units to refreshes of the display that occur at frame intervals corresponding to a refresh rate of the display;
    when starting a frame interval and starting execution of a CPU work unit, determining whether a GPU work unit is currently executing on the GPU;
    when determined that a GPU work unit is currently executing on the GPU, if not in a parallel mode, entering the parallel mode, the parallel mode comprising a mode that causes GPU work units to begin executing in parallel with CPU work units; and
    when determined that a GPU work unit is not currently executing on the GPU, determining whether operating in the parallel mode, if operating in the parallel mode, exiting the parallel mode such that the CPU and GPU are unable to execute their respective work units concurrently.

2. A method according to claim 1, further comprising executing in a non-parallel mode prior to entering the parallel mode, the non-parallel mode such that CPU work units and their respective GPU work units start executing at the beginning of respective frame intervals.

3. A method according to claim 2, further comprising again determining whether a GPU work unit is currently executing on the GPU and when determined that a GPU work unit is not currently executing on the GPU executing the parallel mode and reentering the non-parallel mode.

4. A method according to claim 1, wherein entering the parallel mode causes GPU work units generated by respective CPU work units to begin executing in frame intervals that follow the frame intervals in which the respective CPU work units begin executing.

5. A method according to claim 4, further comprising exiting the parallel mode such that GPU work units begin executing in the same frame intervals in which their corresponding CPU work units execute.

6. A method according to claim 5, further comprising signalling a video subsystem each time the parallel mode is entered and exited, the video subsystem changing how it computes according to the signalling.

7. A method according to claim 1, wherein the CPU work units begin executing in response to refresh signals from the GPU, the refresh signals corresponding to refreshes of the display.

8. A computing device comprising:
    a central processing unit (CPU) to execute a sequence of CPU work units including a first CPU work unit and a second work unit that immediately follows the first CPU work unit in the sequence of CPU work units;
    a graphics processing unit (GPU) to execute a sequence of GPU work units respectively corresponding to the CPU work units, the GPU work units including a first GPU work unit corresponding to the first CPU work unit and a second GPU work unit corresponding to the second CPU work unit;
    a display on which graphics corresponding to the GPU work units are displayed, the display displaying at a refresh rate; and
    storage storing instructions that when executed by the processor will cause the CPU work units to begin executing in sync with refreshes of the display at the refresh rate, the instructions dynamically determine when to enter a parallel mode and when to exit the parallel mode by:
        determining, in association with executing a CPU work unit, whether the GPU is executing a GPU work unit,
        if determined that a GPU work unit is not executing and if in the parallel mode, exiting the parallel mode,
        if determined that a GPU work unit is executing and if not in the parallel mode, entering the parallel mode,
    wherein in the parallel mode CPU work units and GPU work units execute concurrently and when not in the parallel mode CPU work units do not execute concurrently with the GPU work units.

9. A computing device according to claim 8, wherein in the parallel mode GPU work units start in vsync intervals that follow respective vsync intervals in which they were generated by corresponding CPU work units.

10. A computing device according to claim 8, wherein the instructions when executed operate in time frames that correspond to the refresh rate such that each refresh of the display has a respective time frame, and in each time frame: the CPU executes a new CPU work unit that generates a new GPU work unit.

11. A computing device according to claim 10, wherein the instructions when executed not in the parallel mode cause the new GPU work unit to begin executing in the time frame in which it was generated.

12. A computing device according to claim 11, wherein the instructions when executed not in the parallel mode cause the new GPU work unit to begin executing in a time frame that follows the time frame in which it was generated by the new CPU work unit.

13. A computing device according to claim 12, wherein the instructions when executed determine when to enter the parallel mode by determining whether a GPU work unit that started in a previous time frame is still executing on the GPU.

14. A computing device according to claim 8, wherein the instructions when executed exit the parallel mode when determined that there are no pending CPU work units to be executed.

15. A computing device according to claim 8, wherein the storage further stores instructions corresponding to a window manager that performs compositing, the window manager controlling when to enter and exit the parallel mode.

16. One or more computer-readable storage media, wherein the storage media is not a signal, the storage media storing information to enable a computing device to perform a process, the process comprising:
    executing CPU work units and respective GPU work units on a CPU and a GPU respectively, the execution of the GPU work units generating corresponding graphics on a display;

synchronizing starts of execution of the CPU work units to refreshes of the display that occur at frame intervals corresponding to a refresh rate of the display;

during a frame interval having a CPU work unit to be executed therein, determining whether a GPU work unit is currently executing on the GPU;

when determined that a GPU work unit is currently executing on the GPU, entering a parallel mode, wherein when in the parallel mode GPU work units are allowed execute in parallel with CPU work units, and when not in the parallel mode GPU work units are not allowed to execute in parallel with CPU work units;

when determined that a GPU work unit is not currently executing on the GPU, exiting the Parallel mode if in the parallel mode.

17. One or more computer-readable storage media according to claim 16, wherein the dynamically determining comprises determining that there are no CPU work units to be executed.

18. One or more computer-readable storage media according to claim 16, wherein entering the parallel mode increases a latency between display of graphics and a corresponding event that initiated the display of the graphics, and exiting the parallel mode reduces the latency.

19. One or more computer-readable storage media according to claim 16, storing further information to execute a compositing window manager that performs the process.

20. One or more computer-readable storage media according to claim 16, wherein the determining whether a GPU work unit is currently executing on the GPU is performed at the beginning of a frame interval.

* * * * *